FIG.1a - IN AUDIO UNIT

INVENTOR.
PAUL J. HEINBERG
BY
Browne, Schuyler & Beveridge
ATTORNEY

3,266,172
AUTOMATED INSTRUCTIONAL DEVICE
Paul J. Heinberg, 1437 Franklin St., Iowa City, Iowa
Filed Sept. 16, 1963, Ser. No. 309,240
11 Claims. (Cl. 35—8)

This invention relates to an automated instructional device and, more particularly, to a device for presenting programmed information to a student for teaching purposes.

In my prior patent application, Serial No. 155,121, filed November 27, 1961, now Patent Number 3,221,420, I disclose an audio-visual teaching machine and method wherein the visual stimulus is carried in chart form in horizontal rows and vertical columns with an electromechanical selection matrix for selecting the particular bit of visual stimuli to be presented to a student and, at the same time, coordinating the axial positioning of a transducer along a magnetic drum on which parallel groups of parallel tracks of information are recorded. Control devices associated with the respective audio and visual systems are both synchronized and the stimuli are independently presented to the student in such a way as to allow the student to make his response to the presented stimuli (whether audio or visual) and, at the same time, provide immediate response reinforcement by allowing the student to determine whether or not he has given the correct response.

An object of the present invention is to provide an improved apparatus for audio and visual presentation of the respective stimuli.

A further object of the invention is to provide a non-changeable written response correlated to the presentation of the audio and/or visual stimuli.

Briefly described, the present invention features a magnetic drum having parallel audio information tracks similar to the audio information tracks disclosed in my prior application. The scanning head or transducer is, however, indexed by an electrical stepping switch which is controlled so as to advance the scanning or read head across the different tracks of audio stimuli, while the drum carrying the magnetic loop is rotated by a synchronous motor at a constant speed. The magnetic head is advanced by a threaded rod which is coupled to a reversible stepping motor.

Electrically coupled to the audio unit is a visual presentation unit which includes an ADVANCE switch electrically coupled to the stepping relay so that for each actuation of the ADVANCE switch the read head is advanced one audio track. At the same time, a film "frame" of visual learning material associated with the audio track is projected upon a viewing screen.

As in my earlier application, the read head is connected through an amplifier which includes a LISTEN switch which enables the audio energy picked up by the read head to be fed to earphones so that the student may listen to the message or the audio stimulus as many times as he desires before making his response. The visual unit may be provided with an ANSWER tape upon which the student may write his answer. When the student completes his response he depresses an ANSWER switch which advances the tape under a window at which the correct answer is revealed and the student is prevented from changing the response.

The above objects, advantages and features of the invention will become more apparent from the following detailed description when taken in conjunction with the accompanying drawings wherein:

FIG. 1a is an electrical block diagram of the audio presentation unit;

Figure 1:
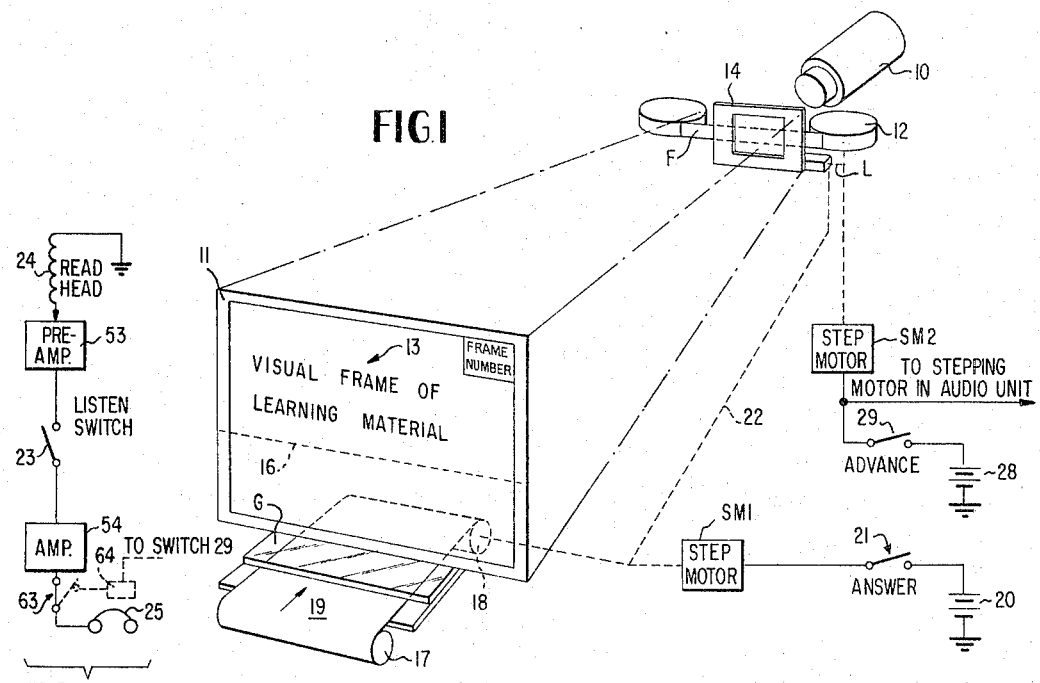
FIG. 1 is a diagrammatic illustration of a visual presentation unit of the invention.

The visual display and response recording unit is shown in FIG. 1 as a substantially separate unit or instrumentality which may be used as a teaching device for presenting visual stimuli alone. However, it will be appreciated that the visual display and response recording unit and the audio unit may be housed within a single housing.

Referring now to FIG. 1, the visual display and response recording unit is shown as including a light projector and lens system 10 for projecting a beam of light towards a frosted screen 11. A film cartridge or magazine 12 and film F carrying thereon frames of recorded program material for presentation in visual form, such as a visual frame of learning material, has the image carried on each frame projected onto the screen 11 by the projector 10. As will be discussed more fully later, each frame carries a segment of learning material along with instructions for the user of the device, and this material is carried on a portion of the film strip 13 so that the image thereof on screen 11 appears at the upper half thereof. The lower half of the screen image is blocked by a shutter plate 14 the operation of which is described later herein. The imaginary line 16 shown extending across the screen 11 divides the screen into two sections, the upper section of which is reserved for the presentation of instructional material and messages, while the lower portion thereof is reserved for the presentation of "answers" to questions presented to the student.

A roll of paper tape 17 unwinds into the machine onto a take-up roll 18 and presents an area 19 for written responses by the student using the machine. Positioned in front of the area 19 is a clear glass "G" or plastic coverplate under which the roll of paper tape is advanced. Take-up roll 18 is advanced by a stepping motor SM1 which is connected to a battery 20 through an ANSWER switch 21. Stepping motor SM1 advances the written response area 19 under the clear glass "G" so as to prevent further written response to the student. At the same time, a linkage 22 operated by stepping motor SM1 releases the shutter 14 so as to prevent the blockage or masking of the lower half of the screen 11 below the imaginary line 16. Thus, when the student has pressed the ANSWER switch 21 energizing stepping motor SM1 for one step, the answer or written response which he has given in the written response area 19 is advanced under the clear glass "G" so that he may see his answer and compare it with the correct answer which is imaged on the screen below line 16 by projector 10.

Before obtaining the correct answer, the student may be instructed by the visual program material whether or not to depress the LISTEN button 23 (FIG. 1a) to connect the read head 24 to the headphone 25 so that he will receive an audio stimuli corresponding or augmenting the visual frame of program material which has been presented. It will be appreciated that the order of presenting the information stimuli may be reversed or it may be presented simultaneously. However, in this preferred form, one or the other of the stimuli is presented first and the other stimuli is thereafter presented. In either case, the means for presenting the stimuli are relatively independent of one another so that the student or user may have as many repetitions of the stimuli as he desires.

Each frame of program material on the film F is advanced into position by a stepping motor SM2 which is energized from a battery 28 through an ADVANCE switch 29 so that for each depression of ADVANCE switch 29 the stepping motor is energized once to advance the film strip F in front of the projection unit 10 to successively present different visual frames of learning material. At the same time that the stepping motor SM2 advances the film strip F in film cartridge 12, a latching linkage L to the shutter 14 resets the shutter to block the projection of an image onto the lower section of the viewing screen 11.

The shutter mechanism is latched by a mechanical latch (not shown) in the position shown in FIG. 1 and is unlatched by the mechanical connection 22 to the shutter mechanism 14.

Figures 2, 3:
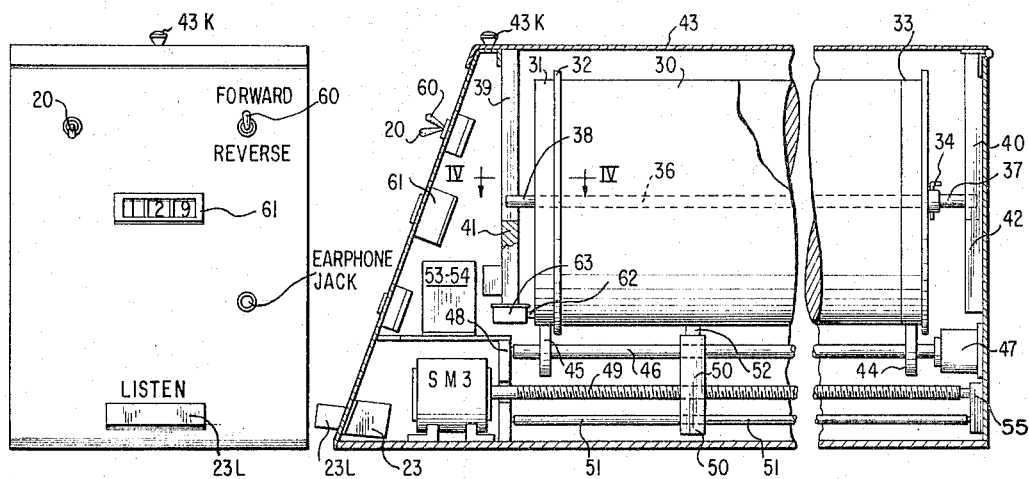
FIG. 2 is a cutaway sectional view of the audio unit of the invention.
FIG. 3 is a front elevational view of the audio unit shown in FIG. 2.
Figure 4:
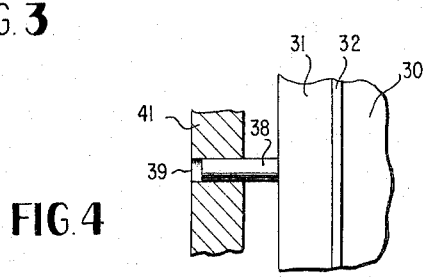
FIG. 4 is a sectional view taken on lines IV—IV of FIG. 2.

The ADVANCE switch 29 also energizes the stepping motor SM3 (FIG. 2) to advance the magnetic read head 24 (FIG. 1a) axially along the magnetic cylinder 30 (FIG. 2).

Referring now to FIG. 2 which discloses the auditory unit of this invention, a prerecorded magnetic cylinder 30 carried on drum 31 and positioned against a flange 32 is secured by a retaining disc 33 that is held in place by a retaining pin 34. The drum 31 is mounted on an axle 36 which has ends 37 and 38 extending outwardly therefrom and received in grooves 39 and 40 in end plates 41 and 42 so that the drum may be removed when the hinged cover 43 is raised. The grooves prevent lateral movement of the drum during rotation. However, the drum rests upon and is frictionally driven by a pair of laterally spaced rubber capstans 44 and 45 which are mounted on a drive shaft 46 which is driven by a synchronous motor 47. Synchronous motor 47 is operated continuously and is energized by actuation of switch 20 which also supplies power to the electronic circuits. The driving shaft 46 is journaled in a bearing 48 so that the drum 31 rests proximate its ends on the capstans 44 and 45 and is thus rotated at a constant speed by synchronous motor 47.

Extending axially parallel to the drum 31 is a lead screw shaft 49 journaled in bearing 55 and turned fractional turns by a stepping motor SM3. Carried on screw shaft 49 is a follower member 50. A fixed parallel guide rod 51 freely passes through follower 50 to prevent the rotation thereof so that on rotation of screw shaft 49 the follower member 50 is advanced along the shaft in accordance with the step-wise rotation of the screw shaft 49. A magnetic read head 52 is carried on follower member 51 and, thus, is advanced with the follower member 50 in accordance with the step-wise drive of step motor SM3. Read head 52 is electrically connected to a preamplifier circuit 53 which is coupled through LISTEN switch 23 to amplifier 54 and thence to the headphone 25. It will be appreciated that the LISTEN switch 23 may be located between the read head 24 and the preamplifier 53 or between the amplifier 54 and the headphone 25. It will also be appreciated that preamplifier 53 may be omitted if the amplifier 54 has sufficient gain.

To insert a prerecorded magnetic loop 30 on the drum 31, the hinged lid 43 is raised by means as a knob 43K and the drum 31 is simply lifted out, the grooves 39 and 40 guiding the cylinder 31 out of the housing. The retaining pin 34 and the retaining ring 33 are removed and the prerecorded magnetic loop 30 is removed and a new one is slipped onto the drum (a color code enabling the student to place the proper end of the loop 30 onto the proper end of the drum 31). Retaining disc 33 and pin 34 are replaced and the drum axle ends 37 and 38 are returned to grooves 39 and 40 and the drum lowered into place onto capstans 44 and 45. Lid 43 is then closed and power switch 20 is turned on to energize the electronic circuit and start the synchronous motor 47 to drive the capstans 44 and 45 at a constant speed so that the magnetic belt or loop 30 is driven at a constant speed past the read head 52. The magnetic variations in flux on each individual parallel track on the loop 30 induce electral voltages in the magnetic read head 52 which are amplified by the amplifier system 53, 54 and LISTEN switch 23 to the earphones 25 which converts the electrical signals back into sound.

When the student depresses the ADVANCE switch 29 the battery 28 supplies electrical energy to stepping motor SM3 which rotates screw rod 49 a fraction of a turn so as to move the follower member 50 to the next prerecorded message track. The student reads the visual portion of the frame on the screen 11 (the upper portion thereof) by the amplifier system 53, 54 and LISTEN switch 23 to which in most cases will ask him to LISTEN. The student then depresses the LISTEN switch lever 23L (FIG. 3) which enables the sound picked up by the read head 52 to be fed to the earphones 25. The student may listen to the same message over and over, as many times as required, before and/or during his making a written response in the area 19 on the paper tape 17 (FIG. 1). When the student completes his response, he depresses the ANSWER switch 21 (FIG. 1) to energize stepping motor SM1 which advances the tape area 19 under the clear glass member "G." At the same time, the shutter member 14 is unlatched from its latched position by the meichanical connection 22 so that the student may then check his written answer with the answer projected upon the lower portion of the screen 11.

Each time the ADVANCE switch 29 is actuated, a three-digit counter 61 is stepped one digit. The counter 61 is actuated by a solenoid energized each time the stepping motor SM3 is energized. Each film frame carries in a corner thereof, in the upper right-hand corner as projected upon the screen 11, a frame number which must correspond to the reading of counter 61 to initially synchronize the advancement of the film F in the cartridge 12 with the advancement of the read head 52 along the magnetic cylinder drum 30. Initially, the magnetic read head 52 is in the extreme left-hand end of FIG. 2 and advances from left to right. When the final frame is completed, the student is instructed by the machine to place the forward-reverse switch 60 into REVERSE position which causes the stepping motor SM2 and the stepping motor SM3 both to simultaneously reverse their direction of stepping. Switch 60 merely reverses the polarity of batteries 20 and 28 to their respective stepping motors. The student is also instructed at that time to remove the film cartridge 12 and place in the next film cartridge. If the film is large enough to accommodate two "frames" the student may be instructed to "flip" the film cartridge and place the next prerecorded magnetic loop on the drum. The read head 52 will then be stepped from right to left.

The circuit shown in FIG. 1a also delays the initiation of an audio message until the beginning of the message rather than at whatever point of the audio track the read head 52 is in at the time the LISTEN switch 23 is depressed. This is achieved by means of a pin 62 projecting from the end of the drum. Pin 62 closes a two-position switch 63 which completes the circuit between the LISTEN switch 23 and the earphone 25. LISTEN switch 23 is opened by a solenoid 64 when the ADVANCE switch 29 is actuated. When this feature is employed, the student is instruced to align a colored coded dot on the magnetic loop with a second colored coded dot alongside the pin 62 which aligns the starting point of each message with the pin 62.

The invention features a built-in response tape which permits the student to give a written response or answer on the response tape which is then advanced (when the student requests the answer to be given to him) to a position under a shield where the answer cannot then be changed. If the student has made an incorrect response, he has the opportunity to write the correct response or advance to the next frame. It will be appreciated that the paper tape and the mechanism for actuating same may be eliminated should it be desired to afford an opportunity for oral responses or nonmonitored written responses.

The auditory unit of the apparatus includes a magnetic member belt which may be easily and rapidly changed. Moreover, a large number of message units or tracks may be recorded on the drum, the duration of each message being proportional in part to the speed of rotation of the drum and to the diameter of the drum. In addition, there is easy synchronization between the presentation of the audio and visual stimuli and the response recording unit.

While I have shown and described a preferred embodiment of my invention, it will be appreciated that numerous modifications and changes may be made thereto without departing from the scope of the invention. Accordingly, it is desired to comprehend all such modifications within this invention as may fall within the scope of the appended claims.

What I claim is:

1. In an audio-visual teaching machine having means for presenting in step-wise sequence successive frames of visual stimulus, an audio record medium comprising a plurality of parallel endless storage tracks disposed on the medium in sequence and in order of material stored on said visual record medium, each track carrying an audio stimulus related to one of the frames of visual stimulus, and control means for independently presenting the audio and visual stimuli to a user in such a way as to allow that user to make a response to the presented stimulus, the improvement which comprises means for supporting and rotating the said audio record medium about the longitudinal axis thereof transverse to the parallel record tracks, a scanning head for scanning said record tracks in sequence, motor means for advancing said scanning head to different ones of said parallel tracks to scan same, and means for synchronizing the movement of said scanning head with the movement of said visual record medium so that as successive frames of said visual record medium are presented for visual display successive ones of said record tracks are scanned by said scanning head, and means for translating the signals produced by said scanning head into an audio stimulus.

2. In an automated instructional device having means for presenting audio and visual stimuli and means for synchronizing the presentation of the respective stimuli, improvements in the audio means of said device which comprises
a magnetic record cylinder,
at least a pair of rotatable support members on which the outer surface of said magnetic record cylinder rests,
means for driving at least one of said rotatable support members at a constant speed,
a carrier member,
a magnetic read head mounted on said member,
a lead screw extending axially parallel to said magnetic record cylinder and journaled proximate its ends for rotation about its longitudinal axis,
means on said carrier member threadably engaged with said lead screw so that as said lead screw is rotated said carrier member is advanced along a line parallel to said magnetic cylinder,
motor means for intermittently rotating said lead screw to advance said carrier member and read head to a different position proximate said magnetic cylinder,
switch means,
sound reproducing means,
and means connecting said switch means between said read head and said sound reproducer.

3. In an automated instructional device having means for presenting audio and visual stimuli and means for synchronizing independent presentation of the respective stimuli, wherein said means for presenting the audio stimuli comprises a magnetic record cylinder and a scanning head therefor, the improvement which comprises
a shaft extending parallel to and spaced from the axis of said magnetic record cylinder,
at least a pair of spaced capstans mounted on said shaft proximate the ends of said magnetic record cylinder,
and motor means for driving said shaft and capstans at a constant speed,
said magnetic record cylinder being supported by said capstans and frictionally rotated thereby.

4. In an automatic instructional device as defined in claim 3, further including guide means for said magnetic record cylinder guiding said cylinder during the placement thereof on said capstan and preventing lateral displacement thereof.

5. In an automated instructional device having means for presenting audio and visual stimuli as defined in claim 3 further including a lead screw extending axially parallel to said magnetic record cylinder and the shaft carrying said capstans,
a carrier drivingly engaged with said lead screw,
said scanning head being mounted on said carrier for movement along a path parallel to the axis of said shaft carrying said capstans,
and motor means for intermittently rotating said lead screw in a direction to advance said carrier member and scanning head to different index positions proximate said magnetic cylinder.

6. In an aduio visual teaching machine having means for presenting in sequence successive frames of visual stimulus and in step-wise fashion and an audio record medium comprising a plurality of parallel endless storage tracks disposed on the audio record medium in sequence and in the order of material stored on said visual record medium, the improvements which comprise
a cylindrically-shaped audio record medium having axle shafts extending outwardly therefrom,
a frame member,
a pair of laterally spaced guide slots in said frame member freely guiding said axle shafts,
drive means for said cylindrical record medium comprising a pair of laterally spaced friction drive wheels supporting said cylinder within said guide slots,
means for driving said capstans at a constant speed,
and a scanning head for scanning record tracks in sequence and means for advancing said scanning head to different ones of said parallel tracks to scan same.

7. A magnetic playback device for sequentially presenting programmed instructional material comprising an elongated drum carrying about its surface a magnetic record medium with a series of parallel record tracks thereon,
a pair of spaced capstans frictionally supporting said drum adjacent each end thereof,
means for driving said capstans at a constant speed,
and means preventing lateral displacement of said drum relative to said capstans.

8. In a magnetic playback device,
an elongated drum carrying about its surface a magnetic record medium,
a pair of axially aligned spaced capstans supporting said drum, said capstans engaging the outer surface of said drum adjacent each end thereof,
means for driving said capstans at a constant speed to thereby frictionally rotate said drum,
and means for preventing lateral displacement of said drum relative to said capstans.

9. In an audio device, a cylinder having on its surface a magnetic record medium,
at least a pair of spaced rotatable members below said cylinder and on which said cylinder rests,
means for driving at least one of said rotatable members at a constant speed to thereby frictionally rotate said cylinder,
transducer means adjacent said cylinder and aligned with the axis of said rotatable members and means for advancing said transducer means along a path parallel to the axis of said cylinder and along the axis of said rotatable members.

10. The audio device as defined in claim 9 further including,
- guide axles extending outwardly from the ends of said cylinder,
- and a pair of members having vertical guide slots therein receiving said guide axles, respectively, for guiding said cylinder to said rotatable members and said transducer means.

11. A magnetic playback device for an endless magnetic record medium carrying a plurality of parallel endless record tracks disposed therealong, comprising,
- means for rotating said endless magnetic medium at a constant speed so that each section of said record tracks move past a fixed point at a fixed speed,
- a scanning head at said fixed point for scanning individual ones of said record tracks,
- means for intermittently moving said scanning head to scan successive ones of said endless record tracks,
- an amplifier connected to said scanning head for receiving electrical signals therefrom,
- a headphone connected to said amplifier and energized thereby,
- means for disabling the amplifier during movement of said scanning head,
- and counter means for indicating at which of said parallel record tracks said scanning head is located.

References Cited by the Examiner

UNITED STATES PATENTS

| | | | |
|---|---|---|---|
| 3,126,646 | 3/1964 | Penraat et al. | 35—9 |
| 3,136,072 | 6/1964 | Ross | 35—35.3 X |
| 3,161,729 | 12/1964 | McCarty et al. | 179—100.2 |

EUGENE R. CAPOZIO, *Primary Examiner.*

LAWRENCE CHARLES, *Examiner.*

WILLIAM GRIEB, *Assistant Examiner.*